US007733053B2

(12) United States Patent
Yang et al.

(10) Patent No.: US 7,733,053 B2
(45) Date of Patent: Jun. 8, 2010

(54) CHARGING CIRCUIT FOR A VEHICLE CHARGER

(75) Inventors: Se-Cherng Yang, Taipei Hsien (TW); Fu-Gen Yang, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 452 days.

(21) Appl. No.: 11/924,381

(22) Filed: Oct. 25, 2007

(65) Prior Publication Data

US 2009/0108825 A1 Apr. 30, 2009

(51) Int. Cl.
*H02J 7/00* (2006.01)
*H02J 7/14* (2006.01)

(52) U.S. Cl. .................. 320/104; 320/112; 320/114
(58) Field of Classification Search .......... 320/104, 320/112–114

See application file for complete search history.

(56) References Cited

U.S. PATENT DOCUMENTS

| | | | | |
|---|---|---|---|---|
| 5,448,152 | A * | 9/1995 | Albright | 320/104 |
| 5,637,978 | A * | 6/1997 | Kellett et al. | 320/104 |
| 5,717,310 | A * | 2/1998 | Sakai et al. | 307/10.1 |
| 5,783,872 | A * | 7/1998 | Blair | 307/46 |
| 6,060,861 | A * | 5/2000 | Feng | 320/105 |
| 2004/0189251 | A1* | 9/2004 | Kutkut et al. | 320/128 |

\* cited by examiner

*Primary Examiner*—Edward Tso
*Assistant Examiner*—Samuel Berhanu
(74) *Attorney, Agent, or Firm*—WPAT, P.C.; Anthony King

(57) ABSTRACT

A charging circuit for a vehicle charger includes a front high-voltage protective circuit, a rear high-voltage protective circuit, a first filtering circuit, an over-voltage protective circuit, a high frequency step-down switching regulator, a second filtering circuit, a frequency modulation circuit, a reference voltage input circuit, a sampling circuit, a short-circuit protective circuit and two charging interfaces. The front high-voltage protective circuit connects to a vehicle DC power, the first filtering circuit connects the front high-voltage protective circuit to the switching regulator, the second filtering circuit connects to an output point of the switching regulator to the rear high-voltage protection circuit, the frequency modulation circuit connects to a second input point of the switching regulator, the third input point of the switching regulator connects to the reference voltage input circuit, the short-circuit protective circuit connects the second filtering circuit to the fourth input point of the switching regulator, the sampling circuit connects the second filtering circuit to the fifth input point of the switching regulator, the rear high-voltage protection circuit connects to the two charging interfaces. For the unique design, the charging circuit for a vehicle charger has a short-circuit protective function and provides two charging interfaces.

4 Claims, 2 Drawing Sheets

US 7,733,053 B2

CHARGING CIRCUIT FOR A VEHICLE CHARGER

BACKGROUND OF THE INVENTION

1. Field of the Invention

This present invention relates to a charging circuit, and more specifically to a charging circuit for a vehicle charger.

2. The Related Art

Since portable electric devices, cameras, mobiles, MP3, etc. are popular today, the battery is designed to be as small as possible. In this case, the battery is needed to be charged rapidly.

A conventional vehicle charger can provide power to charge the battery of the electric device. However, each charger is dedicated to charge only one kind of electric device. In order to charge different electric devices, different chargers must be carried in the vehicle. In this case, it would occupy much space of the vehicle, which is inconvenient to the user.

SUMMARY OF THE INVENTION

An object of the invention is to provide a charging circuit for a vehicle charger comprising a front high-voltage protective circuit, a rear high-voltage protective circuit, a first filtering circuit, an over-voltage protective circuit, a high frequency step-down switching regulator, a second filtering circuit, a frequency modulation circuit, a reference voltage input circuit, a sampling circuit, a short-circuit protective circuit, a first charging interface and a second charging interface.

The front high-voltage protective circuit connects to the output point of a vehicle DC power. The first filtering circuit connects the high-voltage protective circuit to the first input point of the high frequency step-down switching regulator. The input point of the second filtering circuit connects to the output point of the switching regulator. The second input point of the high frequency step-down switching regulator connects to the frequency modulation circuit. The third input point of the high frequency step-down switching regulator connects to the reference voltage input circuit. The short-circuit protective circuit connects the output point of the second filtering circuit to the fourth input point of the high frequency step-down switching regulator. The sampling circuit connects the output point of the second filtering circuit to the fifth input point of the switching regulator to adjust the output voltage from the output point of the switching regulator. The over-voltage protective circuit connects the output point of the second filtering circuit to the high frequency step-down switching regulator. The rear high-voltage protective circuit connects the output point of the second filtering circuit to the first and second charging interfaces.

For the first charging interface and the second charging interface designed in this invention, the charging circuit for a vehicle charger can provide two interfaces, and for the front high-voltage protective circuit, the rear high-voltage protective circuit, the short-circuit protective circuit and the over-voltage protective circuit, the charging circuit for a vehicle charger is not destroyed by short of the first and second charging interfaces.

BRIEF DESCRIPTION OF THE DRAWINGS

The invention, together with its objects and the advantages thereof, may be best understood by reference to the following description taken in conjunction with the accompanying drawings, in which.

DETAILED DESCRIPTION OF THE PREFERRED EMBODIMENT

Figure 1:
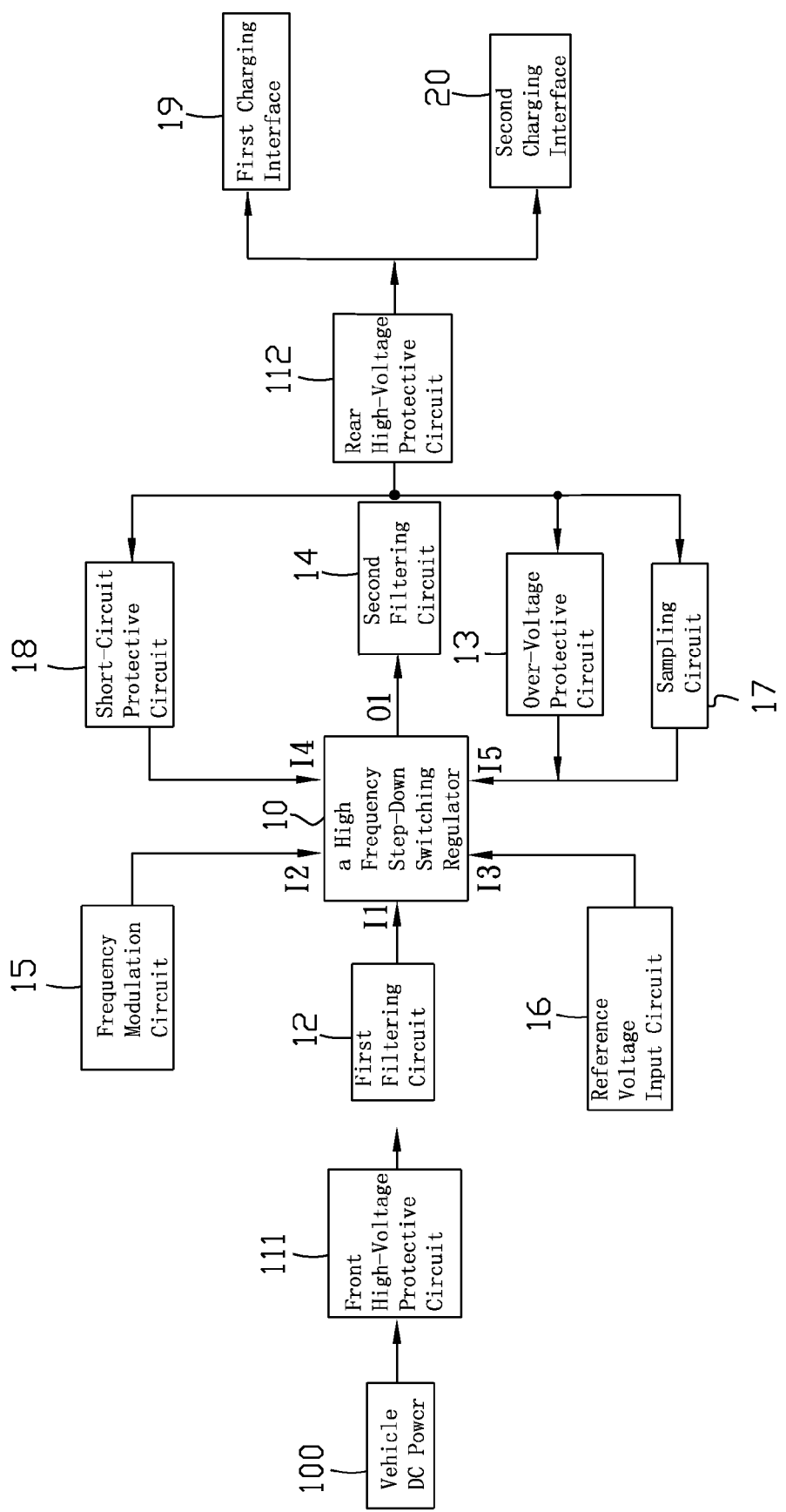
FIG. 1 is a block diagram of a charging circuit for a vehicle charger according to the present invention.

First referring to FIG. 1, a charging circuit for a vehicle charger according to the invention is shown. The charging circuit for a vehicle charger includes a high frequency step-down switching regulator 10, a front high-voltage protective circuit 111, a rear high-voltage protective circuit 112, a first filtering circuit 12, an over-voltage protective circuit 13, a second filtering circuit 14, a frequency modulation circuit 15, a reference voltage input circuit 16, a sampling circuit 17, a short-circuit protective circuit 18, a first charging interface 19 and a second charging interface 20.

An input point of the front high-voltage protective circuit 111 connects to an output point of a vehicle DC power 100. The first filtering circuit 12 connects an output point of the front high-voltage protective circuit 111 to a first input point I1 of the switching regulator 10. An input point of the second filtering circuit 14 connects to an output point O1 of the switching regulator 10, and is used to filter the interfering signal from the switching regulator 10. An second input point I2 of the switching regulator 10 connects to the frequency modulation circuit 15, while the parameter of the frequency modulation circuit 15 is adjusted, the output power of the switching regulator 10 will charge at the same time, so the interfering signal from the outside will not effect the switching regulator 10. A third input point I3 of the switching regulator 10 connects to the reference voltage input circuit 16, the reference voltage input circuit 16 provides a reference voltage to the switching regulator 10, the switching regulator 10 compares the reference voltage with the DC voltage in the inner of the switching regulator 10 to adjust the conduction time of the switching circuit in the inner of the switching regulator 10, and then, the switching regulator 10 will output steady current. The short-circuit protective circuit 18 connects an output point of the second filtering circuit 14 to a fourth input point I4 of the switching regulator 10. The sampling circuit 17 and the over-voltage protective circuit 13 connect the output point of the second filtering circuit 14 to a fifth input point I5 of the switching regulator 10 to adjust the output voltage from the output point O1 of the switching regulator 10. The rear high-voltage protective circuit 112 connects the output point of the second filtering circuit 14 to the first charging interface 19 and the second charging interface 20.

Figure 2:
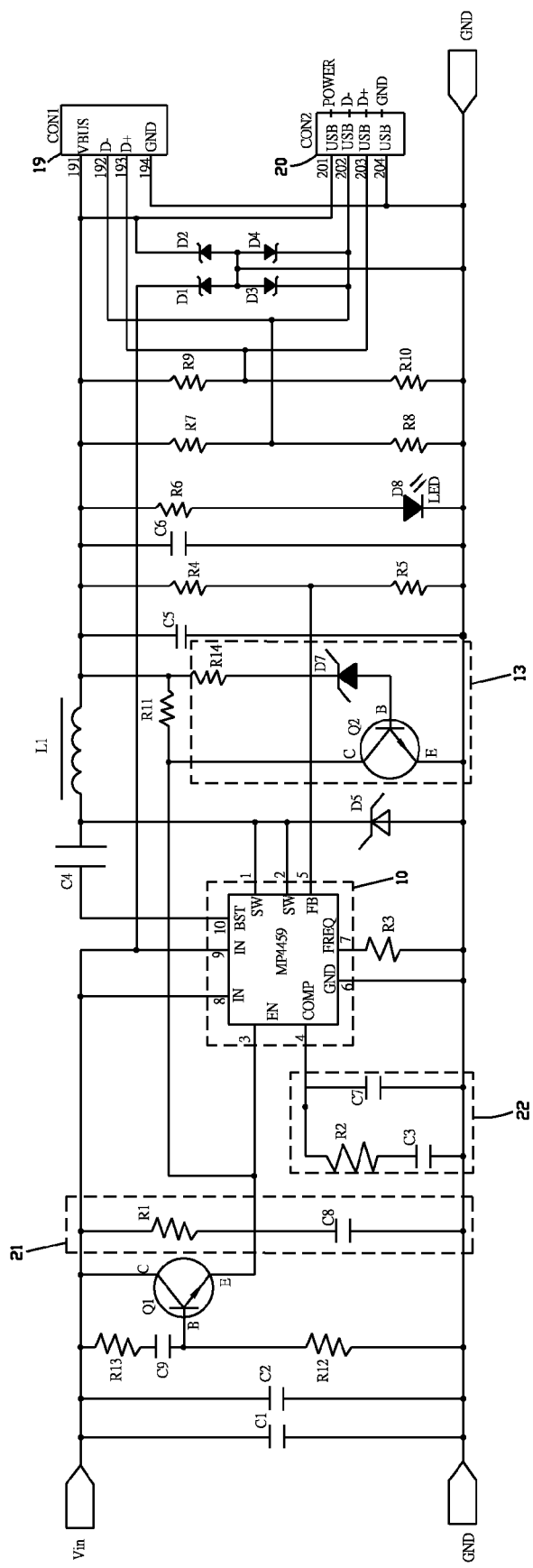
FIG. 2 is a circuit diagram of the charging circuit for a vehicle charger according to an embodiment of the present invention.

Please refer to FIGS. 1 and 2, in this embodiment, the switching regulator 10 is a MP4459 chip. Pins 8 and 9 of the chip are regarded as the first input point I1 of the switching regulator 10, and connect to a supply voltage Vin of the charging circuit for a vehicle charger. Pin 7, pin 2, pin 3, pin 5 and pin 1 of the chip are regarded as the second input point I2, the third input point I3, the fourth input point I4, the fifth input point I5 and the output point O1 of the switching regulator 10 respectively, pin 6 connects to GND of the charging circuit for a vehicle charger.

In this embodiment, the front high-voltage protective circuit 111 is a stable-voltage diode D1 connected between the supply voltage Vin and GND. The first charging interface 19 is a USB connector, which includes a first VBUS signal pin 191, a first D− signal pin 192, a first D+ signal pin 193 and a first ground pin 194 connecting GND, the second charging interface 20 is the same as the first charging interface 19 and includes a second VBUS signal pin 201, a second D− signal pin 202, a second D+ signal pin 203 and a second ground pin 204 connecting GND. The rear high-voltage protective circuit 112 includes a stable-voltage diode D2 connecting the first VBUS signal pin 191 and the second VBUS signal pin 201 with GND, and two stable-voltage diodes D3, D4 parallel connecting each other which connect the first and second D− signal pins 192, 202 with GND.

The first filtering circuit 12 is composed by capacitors C1 and C2 parallel connecting each other. The capacitors C1 and C2 connect the supply voltage Vin to GND. The first filtering circuit 12 is used to filter the interface signal from the supply voltage Vin.

The second filtering circuit 14 is composed by an inductance L1, capacitors C5 and C6 parallel connect each other. One end of the inductance L1 connects to pin 1 and pin 2 of the MP4459 chip, the other end of the inductance L1 connects to the first and second VBUS signal pins 191, 201, the capacitors C5 and C6 connect the first and second VBUS signal pins 191, 201 to GND. A capacitance C4 connects the inductance L1 to pin 10 of the MP4459 chip, to provide power for transistors of the MP4459 chip.

The frequency modulation circuit 15 is composed by a resistance R3. The resistance R3 connects pin 7 of the MP4459 chip to GND. While the resistance R3 is adjusted, the operating frequency of the MP4459 will be adjusted to prevent electromagnetic signal interfering.

The reference voltage input circuit 16 is composed by an unilateral diode D5. The unilateral diode D5 connects pin 1 and pin 2 of the MP4459 chip to GND. The unilateral diode D5 provides a reference voltage to the MP4459 chip, the MP4459 chip compares the reference voltage with the inner voltage of the MP4459 chip to control the conductive time of the inner switching circuit, and then adjusts the MP4459 chip to output steady current.

The sampling circuit 17 is composed by two resistances R4 and R5 connecting each other in series. The resistance R4 connects the VBUS signal pins 191, 201 of the charging interfaces 19, 20 to pin 5 of the MP4459 chip. The resistance R5 connects pin 5 of the MP4459 chip to GND.

The short-circuit protective circuit 18 includes three resistances R11, R12 and R13, a first N-channel transistor Q1 and a capacitor C9. The resistance R13 and the capacitor C9 connecting each other in series connects the supply voltage Vin with the resistance R12 in series, the resistance R12 connects to GND. A base B of the first N-channel transistor Q1 connects between the resistance R12 and the series of the resistance R13 and the capacitor C9, a collector C of the first N-channel transistor Q1 connects to the supply voltage Vin, an Emitter E of the first N-channel transistor Q1 connects to the pin 3 of the MP4459 chip. The resistance R11 connects the VBUS signal pins 191, 201 of the charging interface 19, 20 to the pin 3 of the MP4459 chip.

The over-voltage protective circuit 13 includes a resistance R14, a stable-voltage diode D7 and a second N-channel transistor Q2. One end of the resistance R14 connects to the VBUS signal pins 191, 201 of the charging interface 19, 20. A collector C of the second N-channel transistor Q2 connects to the pin 3 of the MP4459 chip, an emitter E of the second N-channel transistor Q2 connects to GND, the stable voltage diode D7 is connected between a base B of the second N-channel transistor Q2 and the other end of the resistance R14.

A controlling circuit 21 is composed by a resistance R1 and a capacitance C8 connecting each other in series, which connects the supply voltage Vin to GND.

While the charging circuit for a vehicle charger operating, the current from the supply voltage Vin inputs to pins 8 and 9 of the MP4459 chip and then outputs from the pins 1, 2, and then inputs to the first VBUS pin 191 of the first charging interface 19 and the second VBUS pin 201 of the second charging interface 20. If the first VBUS pin 191 and the first ground pin 194 of the first charging interface 19 and/or the second VBUS pin 201 and the second ground pin 204 of the second charging interface 20 make a short circuit, the electric voltage added on the resistance R11 equals to pin 3 of the MP4459 chip and is smaller than the threshold voltage on pin 3, so the MP4459 chip stops operating for protecting the MP4459 chip.

A compensation circuit 22 connects to pin 4 of the MP4459 chip to compensate the frequency loss of the MP4459 chip. The compensation circuit 22 is composed by two capacitances C3, C7 and a resistance R2. The capacitance C3 connects the resistance R2 in series, the capacitance C7 connects with the capacitance C3 and the resistance R2 in parallel. The capacitance C7 connects pin 4 of the MP4459 chip to GND, and the resistance R2 and the capacitance C3 connect the MP4459 chip to GND.

Two resistances R7, R8 connecting each other in series and two resistances R9, R10 connecting each other in series connects the VBUS signal pins 191, 201 of the charging interface 19, 20 to GND. The first D− signal pin 192 of the first charging interface 19 and the second D− signal pin 202 of the second charging interface 20 connect between the resistance R7 and the resistance R8. The first D+ signal pin 193 of the first charging interface 19 and the second D+ signal pin 203 of the second charging interface 20 connect between the resistance R9 and the resistance R10. While the ratios R7/R8 or R9/R10 are adjusted, the voltages between the first D− signal pin 192 and the first D+ signal pin 193 and/or between the second D− signal pin 202 and the second D+ signal pin 203 are charged, so the function of the charging circuit for a vehicle charger is expanded. A resistance R6 and an LED D8 connecting each other in series connect the VBUS signal pins 191, 201 of the charging interface 19, 20 to GND, while the charging circuit for a vehicle charger operating successfully, the LED D8 lighting.

Because the output point of the rear high-voltage protective circuit 112 connects to the first charging interface 19 and the second charging interface 20 synchronously, the charging circuit for a vehicle charger can provide two interfaces, and for the front high-voltage protective circuit 111, the rear high-voltage protective circuit 112, the short-circuit protective circuit 18 and the over-voltage protective circuit 13, the charging circuit for a vehicle charger can operate steadily.

An above description of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A charging circuit for a vehicle charger, comprising:
   a front high-voltage protective circuit, an input point of the front high-voltage protective circuit connected to a DC power;
   a first filtering circuit, an input point of the first filtering circuit connected to an output point of the front high-voltage protective circuit;
   a high frequency step-down switching regulator, having a first input point, a second input point, a third input point and a fourth input point, a fifth input point and an output point of the step-down switching regulator, the first input point connected to an output point of the first filtering circuit;

a second filtering circuit, connected to the output point of the high frequency step-down switching regulator;

a frequency modulation circuit, connected to the second input point of the high frequency step-down switching regulator;

a reference voltage input circuit, connected to the third input point of the high frequency step-down switching regulator;

a short-circuit protective circuit, connecting the fourth input point of the high frequency step-down switching regulator to an output point of the second filtering circuit;

a sampling circuit, connecting the output point of the second filtering circuit to the fifth input point of the high frequency step-down switching regulator;

a rear high-voltage protective circuit connected to the output point of the second filtering circuit;

a first charging circuit, connected to an output point of the rear high-voltage protective circuit; and a second charging circuit, connected to the output point of the rear high-voltage protective circuit.

2. The charging circuit for a vehicle charger as set forth in claim 1, wherein the short-circuit protective circuit includes three resistances, a triode transistor and a capacitor.

3. The charging circuit for a vehicle charger as set forth in claim 1, further comprising an over-voltage protective circuit, the over-voltage protective circuit connecting the output point of the second filtering circuit to the fifth input point of the high frequency step-down switching regulator.

4. The charging circuit for a vehicle charger as set forth in claim 1, further comprising a compensation circuit, the compensation circuit connecting to an input of the high frequency step-down switching regulator to compensate the frequency loss of the high frequency step-down switching regulator, the compensation circuit composed by two capacitances and a resistance, one of the capacitances connecting the resistance in series, the other capacitance connects with the capacitance and the resistance in parallel.

* * * * *